(12) United States Patent
Venkat et al.

(10) Patent No.: US 10,133,743 B2
(45) Date of Patent: Nov. 20, 2018

(54) SYSTEMS AND METHODS FOR DATA MIGRATION USING MULTI-PATH INPUT/OUTPUT AND SNAPSHOT-BASED REPLICATION

(71) Applicant: Dell Products L.P., Round Rock, TX (US)

(72) Inventors: Prakash Venkat, Bangalore (IN); Gopakumar Ambat, Bangalore (IN); G. Paul Koning, New Boston, NH (US)

(73) Assignee: Dell Products L.P., Round Rock, TX (US)

( * ) Notice: Subject to any disclaimer, the term of this patent is extended or adjusted under 35 U.S.C. 154(b) by 304 days.

(21) Appl. No.: 15/040,300

(22) Filed: Feb. 10, 2016

(65) Prior Publication Data

US 2017/0228388 A1  Aug. 10, 2017

(51) Int. Cl.
*G06F 17/00* (2006.01)
*G06F 17/30* (2006.01)
*G06F 3/06* (2006.01)

(52) U.S. Cl.
CPC ........ *G06F 17/30088* (2013.01); *G06F 3/065* (2013.01); *G06F 3/0619* (2013.01); *G06F 3/0665* (2013.01); *G06F 3/0689* (2013.01)

(58) Field of Classification Search
USPC ........................................ 707/639
See application file for complete search history.

(56) References Cited

U.S. PATENT DOCUMENTS

| 9,304,889 B1* | 4/2016 | Chen .................. G06F 11/3452 |
| 2016/0004720 A1* | 1/2016 | Tabaaloute ........ G06F 17/30607 |
| | | 707/639 |
| 2016/0224259 A1* | 8/2016 | Ahrens ................. G06F 3/0619 |

* cited by examiner

*Primary Examiner* — Hung T Vy
(74) *Attorney, Agent, or Firm* — Jackson Walker L.L.P.

(57) ABSTRACT

A method may include establishing, by a MPIO driver of a host information handling system, an I/O path between the host information handling system and the source storage array as an active I/O path and a path between the host and the target storage array as a passive I/O path. The method may also include performing a snapshot-based iterative replication between the source storage array and the target storage array, wherein successive iterations of the snapshot-based iterative replication comprise I/O to the source storage array occurring during an immediately previous iteration of the snapshot-based iterative replication. The method may further include, upon completion of the snapshot-based iterative replication, establishing, by the MPIO, the I/O path between the host and the source storage array as a passive I/O path and the path between the host and the target storage array as the active I/O path.

24 Claims, 4 Drawing Sheets

SYSTEMS AND METHODS FOR DATA MIGRATION USING MULTI-PATH INPUT/OUTPUT AND SNAPSHOT-BASED REPLICATION

TECHNICAL FIELD

The present disclosure relates in general to information handling systems, and more particularly to improving performance of data migration.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In data storage systems, users of different storage technologies store enormous amounts of data on different storage devices. Oftentimes, a user of data desires to migrate the data from one storage system to another. Existing approaches to data migration possess various disadvantages, including difficulty of use, complexity, performance, limitation in the types of storage arrays supported, reconfiguration, and downtime.

SUMMARY

In accordance with the teachings of the present disclosure, the disadvantages and problems associated with data migration between storage systems may be reduced or eliminated.

In accordance with embodiments of the present disclosure, a method for migrating data from a source storage array to a target storage array may include establishing, by a multi-path input/output (MPIO) driver of a host information handling system, an input/output (I/O) path between the host information handling system and the source storage array as an active I/O path and a path between the host information handling system and the target storage array as a passive I/O path. The method may also include performing a snapshot-based iterative replication between the source storage array and the target storage array, wherein successive iterations of the snapshot-based iterative replication comprise I/O to the source storage array occurring during an immediately previous iteration of the snapshot-based iterative replication. The method may further include, upon completion of the snapshot-based iterative replication, establishing, by the MPIO, the I/O path between the host information handling system and the source storage array as a passive I/O path and the path between the host information handling system and the target storage array as the active I/O path.

In accordance with these and other embodiments of the present disclosure, a system for migrating data from a source storage array to a target storage array may include a host information handling system and a controller. The host information handling system configured to establish an input/output (I/O) path between the host information handling system and the source storage array as an active I/O path and a path between the host information handling system and the target storage array as a passive I/O path. The controller may be configured to execute a migration state machine for performing a snapshot-based iterative replication between the source storage array and the target storage array, wherein successive iterations of the snapshot-based iterative replication comprise I/O to the source storage array occurring during an immediately previous iteration of the snapshot-based iterative replication. The host information handling system may further be configured to, upon completion of the snapshot-based iterative replication, establish the I/O path between the host information handling system and the source storage array as a passive I/O path and the path between the host information handling system and the target storage array as the active I/O path.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
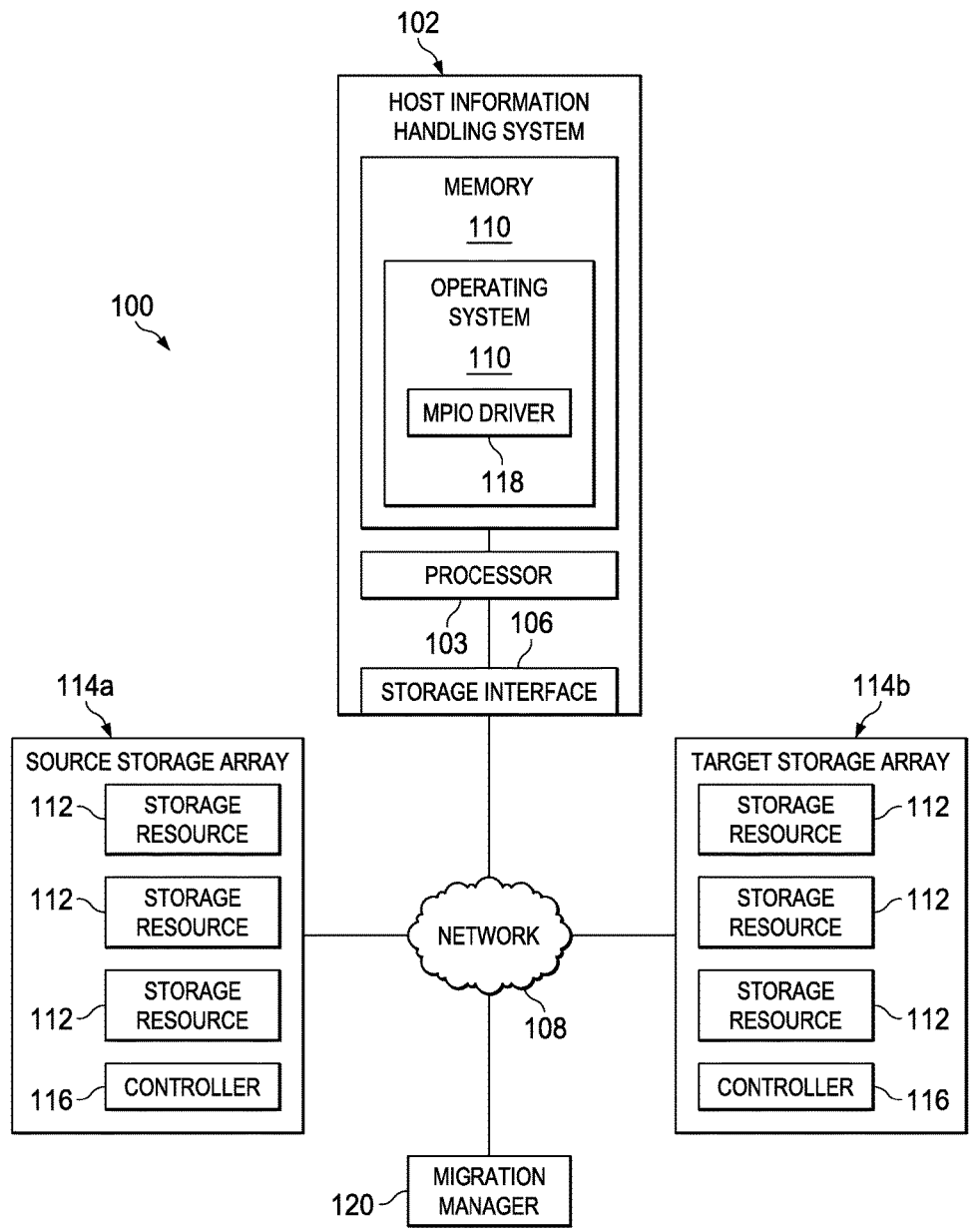
FIG. 1 illustrates a block diagram of an example system for migration of data between two storage nodes, in accordance with embodiments of the present disclosure.

Preferred embodiments and their advantages are best understood by reference to FIGS. 1 through 4, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 for migration of data between two storage nodes 114 (e.g., source storage array 114a and target storage array 114b), in accordance with embodiments of the present disclosure. As shown in FIG. 1, system 100 may include information handling system 102, network 108, storage nodes 114, and migration manager 120.

In some embodiments, host information handling system 102 may comprise a server. In these and other embodiments, host information handling system 102 may comprise a personal computer. In other embodiments, host information handling system 102 may comprise a portable computing device (e.g., a laptop, notebook, tablet, handheld, smart phone, personal digital assistant, etc.). As depicted in FIG. 1, host information handling system 102 may include a processor 103, a memory 104 communicatively coupled to processor 103, and a storage interface 106 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resources 112, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 110. Operating system 110 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 110. In addition, operating system 110 may include all or a portion of a network stack for network communication via a network interface. Active portions of operating system 110 may be transferred to memory 104 for execution by processor 103. Although operating system 110 is shown in FIG. 1 as stored in memory 104, in some embodiments operating system 110 may be stored in storage media accessible to processor 103, and active portions of operating system 110 may be transferred from such storage media to memory 104 for execution by processor 103.

As shown in FIG. 1, operating system 110 may comprise a multi-path input/output (MPIO) driver 118. MPIO driver 118 may comprise any suitable program of instructions that manages input/output (I/O) operations that may provide fault-tolerance and performance-enhancement of I/O by defining more than one physical path between a host system and its associated storage devices through the buses, controllers, switches, and/or bridge devices coupling them. In some embodiments, MPIO driver 118 leverages such redundant paths to provide performance-enhancing features, including dynamic load balancing, traffic shaping, automatic path management, and dynamic reconfiguration.

Storage interface 106 may be communicatively coupled to processor 103 and may include any system, device, or apparatus configured to serve as an interface between processor 103 and storage resources 112 of storage nodes 114 to facilitate communication of data between processor 103 and storage resources 112 in accordance with any suitable standard or protocol. In some embodiments, storage interface 106 may comprise a network interface configured to interface with storage resources 112 located remotely from information handling system 102.

In addition to processor 103, memory 104, and storage interface 106, host information handling system 102 may include one or more other information handling resources.

Network 108 may be a network and/or fabric configured to couple host information handling system 102 to storage nodes 114, and/or migration manager 120. In some embodiments, network 108 may include a communication infrastructure, which provides physical connections, and a management layer, which organizes the physical connections and information handling systems communicatively coupled to network 108. Network 108 may be implemented as, or may be a part of, a SAN or any other appropriate architecture or system that facilitates the communication of signals, data and/or messages (generally referred to as data). Network 108 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 108 and its various components may be implemented using hardware, software, or any combination thereof.

Although FIG. 1 depicts each storage array 114 having three physical storage resources 112, a storage array 114 may have any suitable number of physical storage resources 112.

A storage array 114 may include any suitable collection of storage resources. In some embodiments, a storage array 114 may comprise a storage enclosure configured to hold and power storage resources 112. Storage resources 112 may include hard disk drives, magnetic tape libraries, optical disk drives, magneto-optical disk drives, compact disk drives, compact disk arrays, disk array controllers, and/or any other system, apparatus or device operable to store media.

In operation, one or more storage resources 112 may appear to an operating system or virtual machine executing on information handling system 102 as a single logical storage unit or virtual storage resource 112 (which may also be referred to as a "LUN" or a "volume"). In some embodiments, storage resources 112 making up a logical storage unit may reside in different storage nodes 114.

In addition to storage resources 112, a storage array 114 may include one or more other information handling resources.

As shown in FIG. 1, each storage array 114 may include a controller 116. Controller 116 may include any system, apparatus, or device operable to manage the communication of data between host information handling system 102 and storage resources 112 of storage array 114.

In certain embodiments, controller 116 may provide functionality including, without limitation, disk aggregation and redundancy (e.g., RAID), I/O routing, and error detection and recovery. Controller 116 may also have features supporting shared storage and high availability. In some embodiments, controller 116 may comprise a PowerEdge RAID Controller (PERC) manufactured by Dell Inc.

Migration manager 120 may be coupled to host information handling system 102 via network 108, and may comprise an information handling system, and thus, may include one or more components similar to that of host information handling system 102. As described in greater detail below, migration manager 120 may comprise any system, device, or apparatus configured to act as a management path for and perform a point-in-time snapshot-based copy of data between storage array 114a and storage array 114b, thus transferring a crash-consistent replica between storage nodes 114.

In addition to information handling system 102, network 108, storage nodes 114, and migration manager 120, system 100 may include one or more other information handling resources.

In operation, migration of data between storage nodes 114 may be carried out in two user-initiated steps, including a setup migration step and a start migration step. In some embodiments, both migration steps may be driven from migration manager 120. In initiating migration, a user may in some embodiments be able to set an option for migration including establishing time periods in which transfer of migration data is permitted or prohibited. In these and other embodiments, a user may be able to set an automatic switch variable, which indicates whether I/O from host information handling system 102 should automatically switch from storage array 114a to storage array 114b upon completion of migration, or whether separate user input is needed to complete such switchover.

Figure 2:
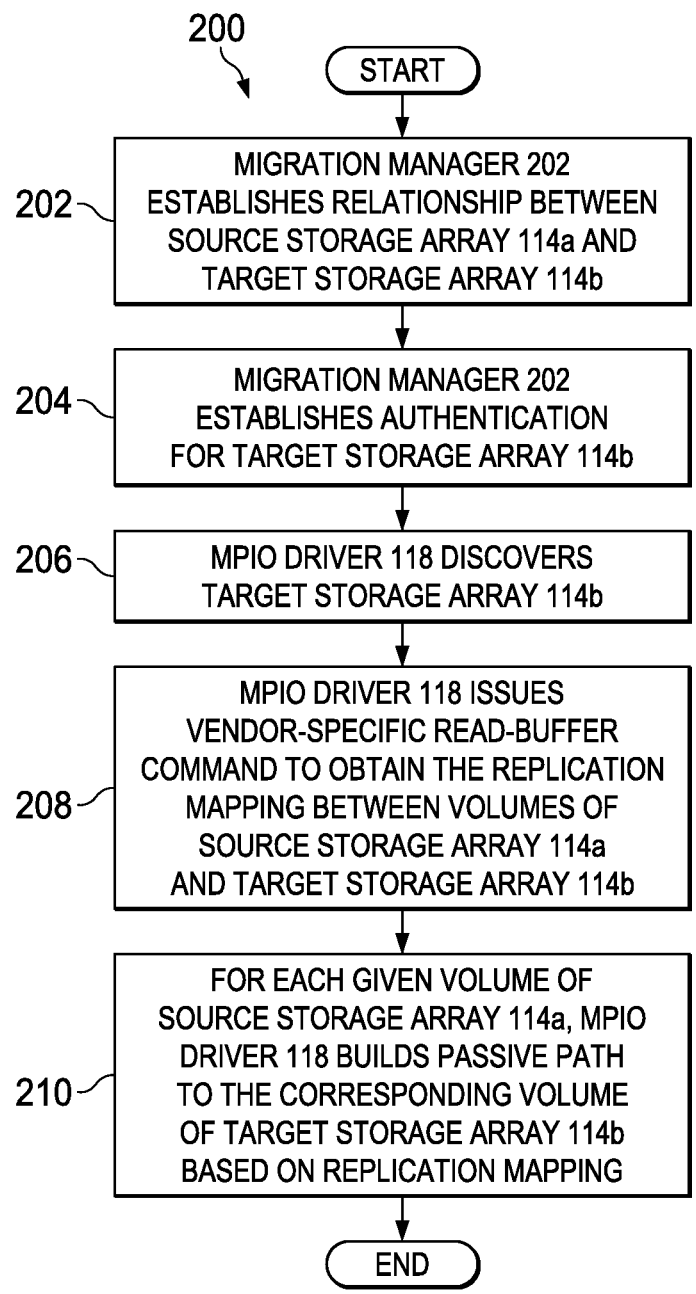
FIG. 2 illustrates a flow chart of an example method for implementing a setup migration step, in accordance with embodiments of the present disclosure.

FIG. 2 illustrates a flow chart of an example method 200 for implementing a setup migration step, in accordance with embodiments of the present disclosure. According to certain embodiments, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, in the setup migration step, migration manager 120 may establish a relationship between source storage array 114a and target storage array 114b, including without limitation establishment of dedicated management and data channels for data transfer as well as any parameters for data transfer. At step 204, the migration step may also establish authentication for target storage array 114b, allowing host information handling system 102 to login to target storage array 114b.

At step 206, furthermore in the setup migration step, MPIO driver 118 may be triggered to discover target storage array 114b. For example, MPIO driver 118 may issue a series of Small Computer System Interface (SCSI) commands (e.g., INQ, Report-Lun, TUR, etc.) to recognize storage array 114b and/or its storage resources 112. At step 208, MPIO driver 118 may issue a vendor-specific read-buffer command to obtain the replication mapping between volumes of source storage array 114a and target storage array 114b. At step 210, for each given volume of source storage array 114a, MPIO driver 118 may build a passive path to the corresponding volume of target storage array 114b based on the replication mapping, which may exist simultaneously with the original active path to the volume of source storage array 114a.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 100, components thereof or any other system operable to implement method 200. In certain embodiments, method 200 may be implemented partially or fully in software and/or firmware embodied in computer-readable media.

Figure 3:
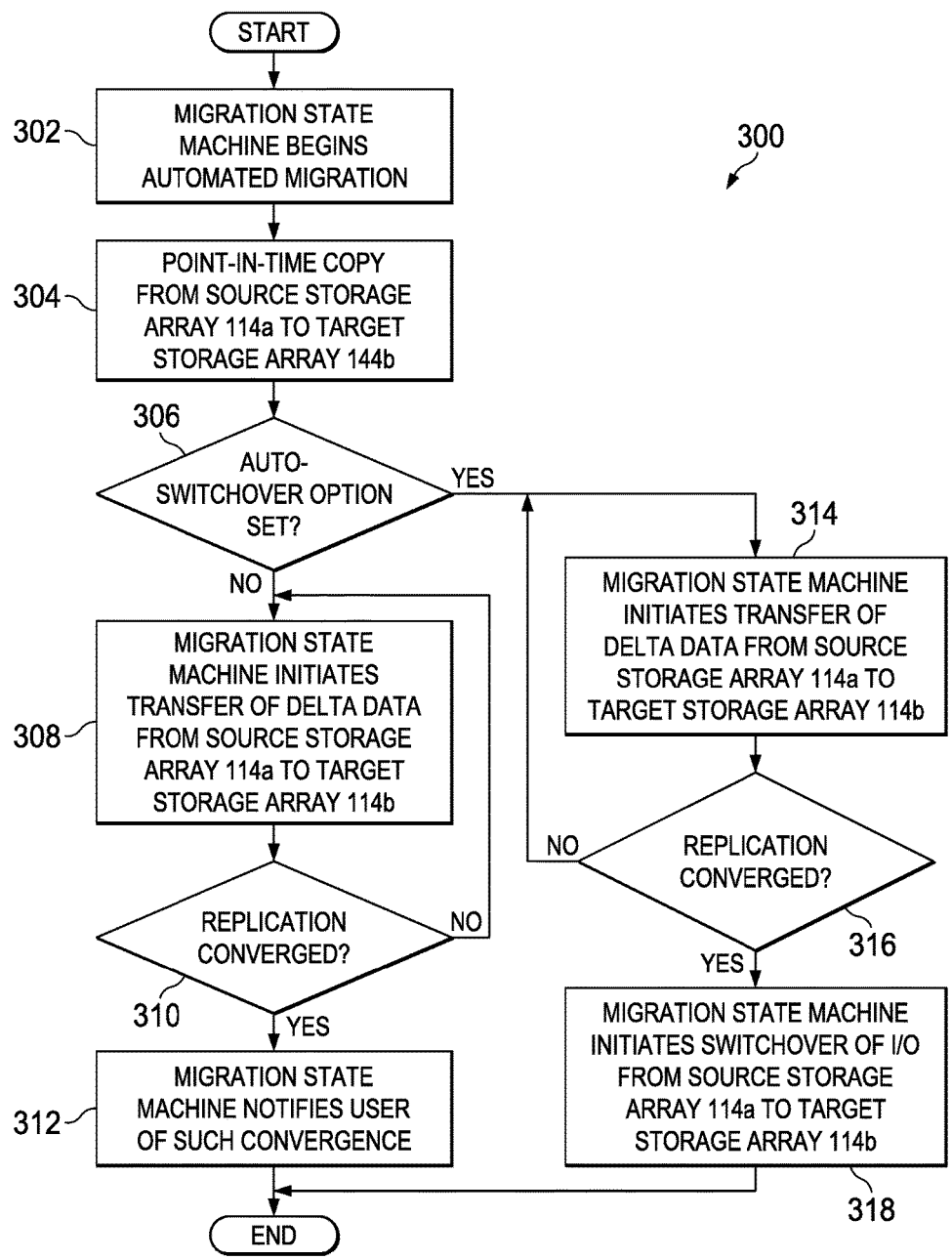
FIG. 3 illustrates a flow chart of an example method for implementing a start migration step, in accordance with embodiments of the present disclosure.

FIG. 3 illustrates a flow chart of an example method 300 for implementing a start migration step, in accordance with embodiments of the present disclosure. According to certain embodiments, method 300 may begin at step 302. As noted above, teachings of the present disclosure may be implemented in a variety of configurations of system 100. As such, the preferred initialization point for method 300 and the order of the steps comprising method 300 may depend on the implementation chosen.

At step 302, start migration may trigger a migration state machine (not shown) executing on controller 116 of source storage array 114a which may undertake migration in an automated manner. At step 304, the start migration step may initiate a point-in-time copy from source storage array 114a to target storage array 114b, at the point in time that the copy is initiated. Any suitable snapshot-based data transfer mechanism may be used for such data transfer. In some embodiments, the transfer may comprise a cross-platform replication (e.g., in embodiments in which storage nodes 114 different storage types/platforms).

At step 306, after completion of the first point-in-time transfer, the migration state machine may determine if a user setting indicates that I/O of host information handling system 102 is to auto-switch upon completion of replication. If the auto-switch option has not been set, method 300 may proceed to step 308. Otherwise, method 300 may proceed to step 314.

At step 308, in response to the auto-switch option not being set, the migration state machine may initiate another transfer of data from source storage array 114a to target storage array 114b, which reflects a "delta" of I/O occurring during the previous transfer. In some embodiments, such transfer may occur during a permitted period of time pursuant to a user option. At step 310, the migration state machine may determine if replication has converged such that a final delta could be transferred within a pre-defined time limit (which, in some embodiments, may be a user-configurable setting). If replication has converged, method 300 may proceed to step 312. Otherwise, method 300 may proceed again to step 308.

At step 312, in response to convergence of replication, the migration state machine may notify a user of such convergence. In response to such notification, the user may initiate switchover of I/O from source storage array 114a to target storage array 114b. After completion of step 312, method 300 may end.

At step 314, in response to the auto-switch option being set, the migration state machine may initiate another transfer of data from source storage array 114a to target storage array 114b, which reflects a "delta" of I/O occurring during the previous transfer. In some embodiments, such transfer may occur during a permitted period of time pursuant to a user option. At step 316, the migration state machine may determine if replication has converged such that a final delta could be transferred within a pre-defined time limit (which, in some embodiments, may be a user-configurable setting). If replication has converged, method 300 may proceed to step 318. Otherwise, method 300 may proceed again to step 314.

At step 318, in response to convergence of replication, the migration state machine may initiate switchover of I/O from source storage array 114a to target storage array 114b. After completion of step 318, method 300 may end.

Although FIG. 3 discloses a particular number of steps to be taken with respect to method 300, it may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using system 100, components thereof or any other system operable to implement method 300. In certain embodiments, method 300 may be implemented partially or fully in software and/or firmware embodied in computer-readable media.

Figure 4:
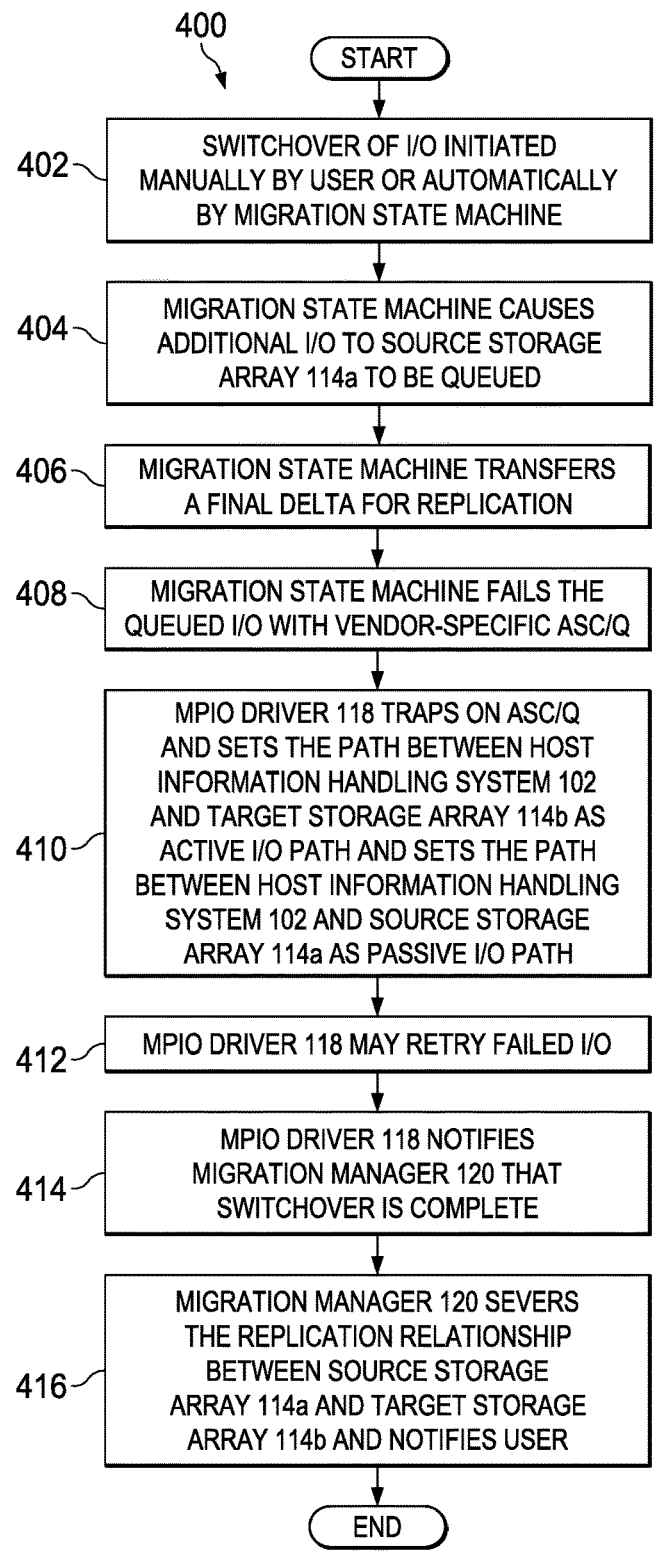
FIG. 4 illustrates a flow chart of an example method for input/output switchover between a source storage array and a target storage array, in accordance with embodiments of the present disclosure.

FIG. 4 illustrates a flow chart of an example method for I/O switchover between source storage array 114a and target storage array 114b, in accordance with embodiments of the present disclosure. According to certain embodiments, method 400 may begin at step 402. As noted above, teachings of the present disclosure may be implemented in a variety of configurations of system 100. As such, the preferred initialization point for method 400 and the order of the steps comprising method 400 may depend on the implementation chosen.

At step 402, switchover of I/O may be initiated by a user (e.g., as described with respect to step 312 of method 300 above) or automatically by the migration state machine (e.g., as described with respect to step 318 of method 300 above). At step 404, in response to initiation of switchover, the migration state machine may cause additional I/O to source storage array 114a to be queued. At step 406, in response to initiation of switchover, the migration state machine may transfer a final delta for the replication. At step 408, the migration state machine may fail the queued I/O with a vendor-specific SCSI additional sense code qualifier (ASC/Q).

At step 410, MPIO driver 118 may trap on the ASC/Q and in response, set the path between host information handling system 102 and target storage array 114b as the active I/O path and set the path between host information handling system 102 and source storage array 114a as a passive I/O path. At step 412, MPIO driver 118 may retry the failed I/O's queued in response to the switchover on the new active path.

At step 414, MPIO driver 118 may notify migration manager 120 that switchover is complete. In response, at step 416, migration manager 120 may sever the replication relationship between source storage array 114a and target storage array 114b and notify a user of same. After completion of step 414, method 400 may end.

Although FIG. 4 discloses a particular number of steps to be taken with respect to method 400, it may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using system 100, components thereof or any other system operable to implement method 400. In certain embodiments, method 400 may be implemented partially or fully in software and/or firmware embodied in computer-readable media.

The methods above assume convergence in replication is reached such that a final delta or snapshot may be transferred within a predetermined period of time. However, in some cases, such convergence may not occur. In such a situation, for example, if convergence does not occur after a particular number of transfers of deltas, migration manager 120 may communicate an alert to a user. In response to the alert, the user may fine-tune I/O load in order to achieve convergence.

In other cases, convergence may be reached, but a user may not have set a variable for auto switchover of I/O. In such cases, migration manager 120 may communicate an alert to a user that I/O is ready to be switched over and the user may act based on the alert.

In some instances, during replication of a final delta, a timer may expire indicating that convergence did not actually occur. In such case, migration manager 120 may not initiate the switchover process, and remain in the iterative process of snapshot-based replication.

In some embodiments, one or more replicas to target storage array 114b may be saved as a test snapshot which may be a crash-consistent image. Accordingly, such test snapshot could be used for offline tests, based upon which, a user may decide whether to set a variable for auto switchover of I/O. For example, if based on offline tests, a user obtains confidence with an application response from the destination, the user could change the variable for auto switchover to automatically switch upon convergence.

In these and other embodiments, MPIO driver 118 may periodically issue a test command (e.g., Test Unit Ready or TUR) on passive I/O paths to ensure the passive paths are still alive. If for some reason, a passive path to target storage array 114b is unavailable, MPIO driver 118 may issue an alert or prevent switchover of I/O until such path is again available.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for migrating data from a source storage array to a target storage array, comprising:
    establishing, by a multi-path input/output (MPIO) driver of a host information handling system, an input/output (I/O) path between the host information handling system and the source storage array as an active I/O path and a path between the host information handling system and the target storage array as a passive I/O path;
    performing a snapshot-based iterative replication between the source storage array and the target storage array, wherein successive iterations of the snapshot-based iterative replication comprise I/O to the source storage array occurring during an immediately previous iteration of the snapshot-based iterative replication;
    upon completion of the snapshot-based iterative replication, establishing, by the MPIO, the I/O path between the host information handling system and the source storage array as a passive I/O path and the path between the host information handling system and the target storage array as the active I/O path;
    determining whether convergence of the snapshot-based iterative replication has occurred; and
    issuing a notification responsive to a determination that convergence of the snapshot-based iterative replication has occurred.

2. The method of claim 1, further comprising issuing by the MPIO driver a vendor-specific command to obtain a replication mapping between volumes of the source storage array and the target storage array.

3. The method of claim 1, further comprising ceasing the snapshot-based iterative replication responsive to a determination that convergence of the snapshot-based iterative replication has occurred.

4. The method of claim 1, further comprising ceasing the snapshot-based iterative replication responsive to a determination that convergence of the snapshot-based iterative replication has occurred and that a user has set a variable indicating that I/O of the host information handling system is to automatically switch over from the source storage array to the target storage array.

5. The method of claim 1, wherein determining whether convergence of the snapshot-based iterative replication has occurred comprises determining whether an iteration of the snapshot-based iterative replication will complete within a predetermined period of time.

6. The method of claim 1, further comprising, upon completion of the snapshot-based iterative replication:
    queueing additional I/O from the host information handling system to the source storage array;
    failing the queued I/O; and
    retrying the failed I/O to the target storage array after the MPIO driver has established the active path between the host information handling system and the target storage array.

7. The method of claim 6, wherein failing the queued I/O comprises failing the queued I/O with a vendor-specific sense-code qualifier.

8. The method of claim 7, wherein the MPIO driver establishes the I/O path between the host information handling system and the source storage array as a passive I/O path and the path between the host information handling system and the target storage array as the active I/O path responsive to the vendor-specific sense-code qualifier.

9. A system for migrating data from a source storage array to a target storage array, comprising:
    a host information handling system configured to establish an input/output (I/O) path between the host information handling system and the source storage array as an active I/O path and a path between the host information handling system and the target storage array as a passive I/O path; and
    a controller configured to execute a migration state machine for performing a snapshot-based iterative replication between the source storage array and the target storage array, wherein successive iterations of the snapshot-based iterative replication comprise I/O to the source storage array occurring during an immediately previous iteration of the snapshot-based iterative replication;

wherein:
the host information handling system is further configured to, upon completion of the snapshot-based iterative replication, establish the I/O path between the host information handling system and the source storage array as a passive I/O path and the path between the host information handling system and the target storage array as the active I/O path; and the migration state machine is further configured to determine whether convergence of the snapshot-based iterative replication has occurred and issue a notification responsive to a determination that convergence of the snapshot-based iterative replication has occurred.

10. The system of claim 9, wherein the host information handling system is further configured to issue a vendor-specific command to obtain a replication mapping between volumes of the source storage array and the target storage array.

11. The system of claim 9, wherein the migration state machine is further configured to cease the snapshot-based iterative replication responsive to a determination that convergence of the snapshot-based iterative replication has occurred.

12. The system of claim 9, wherein the migration state machine is further configured to cease the snapshot-based iterative replication responsive to a determination that convergence of the snapshot-based iterative replication has occurred and that a user has set a variable indicating that I/O of the host information handling system is to automatically switch over from the source storage array to the target storage array.

13. The system of claim 9, wherein determining whether convergence of the snapshot-based iterative replication has occurred comprises determining whether an iteration of the snapshot-based iterative replication will complete within a predetermined period of time.

14. The system of claim 9, wherein the migration state machine is further configured to, upon completion of the snapshot-based iterative replication:
queue additional I/O from the host information handling system to the source storage array;
fail the queued I/O; and
retry the failed I/O to the target storage array after the host information handling system has established the active path between the host information handling system and the target storage array.

15. The system of claim 14, wherein failing the queued I/O comprises failing the queued I/O with a vendor-specific sense-code qualifier.

16. The system of claim 15, wherein the host information handling system establishes the I/O path between the host information handling system and the source storage array as a passive I/O path and the path between the host information handling system and the target storage array as the active I/O path responsive to the vendor-specific sense-code qualifier.

17. A method for migrating data from a source storage array to a target storage array, comprising:
establishing, by a multi-path input/output (MPIO) driver of a host information handling system, an input/output (I/O) path between the host information handling system and the source storage array as an active I/O path and a path between the host information handling system and the target storage array as a passive I/O path;

performing a snapshot-based iterative replication between the source storage array and the target storage array, wherein successive iterations of the snapshot-based iterative replication comprise I/O to the source storage array occurring during an immediately previous iteration of the snapshot-based iterative replication; and
upon completion of the snapshot-based iterative replication:
establishing, by the MPIO, the I/O path between the host information handling system and the source storage array as a passive I/O path and the path between the host information handling system and the target storage array as the active I/O path;
queueing additional I/O from the host information handling system to the source storage array;
failing the queued I/O; and
retrying the failed I/O to the target storage array after the MPIO driver has established the active path between the host information handling system and the target storage array.

18. The method of claim 17, further comprising issuing by the MPIO driver a vendor-specific command to obtain a replication mapping between volumes of the source storage array and the target storage array.

19. The method of claim 17, wherein failing the queued I/O comprises failing the queued I/O with a vendor-specific sense-code qualifier.

20. The method of claim 19, wherein the MPIO driver establishes the I/O path between the host information handling system and the source storage array as a passive I/O path and the path between the host information handling system and the target storage array as the active I/O path responsive to the vendor-specific sense-code qualifier.

21. A system for migrating data from a source storage array to a target storage array, comprising:
a host information handling system configured to establish an input/output (I/O) path between the host information handling system and the source storage array as an active I/O path and a path between the host information handling system and the target storage array as a passive I/O path; and
a controller configured to execute a migration state machine for performing a snapshot-based iterative replication between the source storage array and the target storage array, wherein successive iterations of the snapshot-based iterative replication comprise I/O to the source storage array occurring during an immediately previous iteration of the snapshot-based iterative replication;
wherein the host information handling system is further configured to, upon completion of the snapshot-based iterative replication, establish the I/O path between the host information handling system and the source storage array as a passive I/O path and the path between the host information handling system and the target storage array as the active I/O path; and
wherein the migration state machine is further configured to, upon completion of the snapshot-based iterative replication:
queue additional I/O from the host information handling system to the source storage array;
fail the queued I/O; and
retry the failed I/O to the target storage array after the host information handling system has established the active path between the host information handling system and the target storage array.

22. The system of claim 21, wherein the host information handling system is further configured to issue a vendor-specific command to obtain a replication mapping between volumes of the source storage array and the target storage array.

23. The system of claim 21, wherein failing the queued I/O comprises failing the queued I/O with a vendor-specific sense-code qualifier.

24. The system of claim 23, wherein the host information handling system establishes the I/O path between the host information handling system and the source storage array as a passive I/O path and the path between the host information handling system and the target storage array as the active I/O path responsive to the vendor-specific sense-code qualifier.

\* \* \* \* \*